(12) United States Patent
Ideno et al.

(10) Patent No.: US 7,323,522 B2
(45) Date of Patent: Jan. 29, 2008

(54) CYCLOHEXANETRICARBOXYLIC MONOESTER AND ITS USE

(75) Inventors: Ryuji Ideno, Kanagawa (JP); Takeshi Koyama, Kanagawa (JP); Atsushi Okoshi, Okayama (JP); Takao Ota, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 285 days.

(21) Appl. No.: 10/912,048

(22) Filed: Aug. 6, 2004

(65) Prior Publication Data

US 2005/0070687 A1 Mar. 31, 2005

(30) Foreign Application Priority Data

Aug. 7, 2003 (JP) .............................. 2003-289090

(51) Int. Cl.
*C08L 63/00* (2006.01)
*B32B 27/38* (2006.01)
*H01L 21/56* (2006.01)

(52) U.S. Cl. .................. 525/533; 428/413; 438/127

(58) Field of Classification Search ................ 428/413, 428/414, 415, 416, 417, 418; 438/127; 525/533; 560/1, 114, 115, 127
See application file for complete search history.

(56) References Cited

U.S. PATENT DOCUMENTS

| 2,651,589 | A |   | 9/1953 | Newey et al. |          |
|-----------|---|---|--------|--------------|----------|
| 3,444,237 | A | * | 5/1969 | Jaffe        | 560/127  |
| 5,145,987 | A | * | 9/1992 | Molzahn      | 560/114  |
| 5,723,650 | A | * | 3/1998 | Hirose et al. | 560/127 |
| 7,098,258 | B2 | * | 8/2006 | Ideno et al. | 522/170 |
| 2003/0069135 | A1 | * | 4/2003 | Kober et al. | 504/116.1 |

FOREIGN PATENT DOCUMENTS

| DE | 2021853   |   | 11/1971 |
|----|-----------|---|---------|
| GB | 1448415   |   | 9/1976  |
| JP | 2002-226551 | * | 8/2002 |

OTHER PUBLICATIONS

Machine translation of JP 2002-226551, provided by the JPO website.*

J.M.P. Chen, D. Katsis, S.H. Chen: "Deterministic Synthesis and Optical Properties of Glassy Chiral-Nematic Liquid Crystals" Chemistry of Materials, vol. 15, No. 13, May 21, 2003; pp. 2534-2542, XP002309737.

S. Isoda, H. Yamaguchi: "Medicinal Chemical Studies on Antiplasmin Drugs. VIII. 4-Aminomethylcyclohexanecarboxylic Acid Derivatives having a Carboxyl or Carboxymethyl Group at C2." Chem. Pharm. Bull, vol. 28, No. 8, 1980, pp. 2337-2346, XP001204079; p. 2339, line 21-26.

J.H.P. Utley, G.B. Yates: Electro-organic reactions. Part 11. Mechanism of the Kolbe reaction; the stereochemistry of reaction of anodically generated cyclohex-2-enyl radicals and cations: Journal of the Chemical Society, Perkin Transactions 2, No. 4, 1978, pp. 395-400, XP009041360.

John W. Muskopf: "Curing and processing Technology" Internet Article,'Online! XP002309739 Retrieved from the Internet: URL:www.mrw.interscience.wiley.com/ueic/articles/a09_547/sect3.htlm 'retrieved on Dec. 8, 2004.

* cited by examiner

*Primary Examiner*—Michael J. Feely
(74) *Attorney, Agent, or Firm*—Antonelli, Terry, Stout & Kraus, LLP.

(57) ABSTRACT

The cyclohexanetricarboxylic monoester of the present invention is represented by the following formula 1:

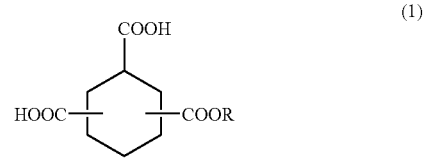

(1)

wherein R is as defined in the specification. The cyclohexanetricarboxylic monoester is useful particularly as the curing agent for epoxy-containing compounds. A heat-curable resin composition comprising the cyclohexanetricarboxylic monoester and an epoxy-containing compound exhibits an excellent curability without using a curing accelerator and provides a colorless transparent cured product which is little discolored even under a long-term exposure to high-temperature conditions. Such a heat-curable resin composition is suitable as sealing materials for photoelectric transducers such as blue LED and white LED, shaped articles, coating materials, adhesives, etc.

12 Claims, No Drawings

CYCLOHEXANETRICARBOXYLIC MONOESTER AND ITS USE

BACKGROUND OF THE INVENTION

1. Field of the Invention

The present invention relates to a novel cyclohexanetricarboxylic monoester and its use, more particularly, to a heat-curable resin composition which is suitably applied to coating compositions, adhesives, shaped articles, sealing materials for photosemiconductors and coating liquids for forming protective films of color filters used in liquid crystal displays (LCD), solid-state image sensors such as charge coupled device (CCD), or electroluminescent (EL) devices, etc., and a novel cyclohexanetricarboxylic monoester which is suitable as a curing agent for use in such a heat-curable resin composition.

2. Description of the Prior Art

High luminance blue LED and white LED which have been recently developed have come to find wide applications in backlights for display boards, full color displays and cellular phones, etc. As the sealing materials for photoelectric transducers such as LED, a heat-curable resin composition comprising an epoxy-containing compound and an acid anhydride curing agent has been conventionally used because of its excellent colorless transparency. As the curing agent for epoxy-containing compound used in sealing photoelectric transducers, alicyclic acid anhydrides such as methylhexahydrophthalic anhydride, methyltetrahydrophthalic anhydride, hexahydrophthalic anhydride and tetrahydrophthalic anhydride have been generally used.

However, since the above alicyclic acid anhydrides show only a low curing reactivity, a curing accelerator must be additionally used to fully cure heat-curable resin compositions. As such curing accelerators, for example, triphenylphosphonium bromide (JP 2000-344868A), 2-ethyl-4-methylimidazole (JP 2001-114868A), ethylhexane salt of 1,8-diazabicyclo[5.4.0]undecene-7 (JP 2002-97251A), and tetraphenylphosphonium bromide (JP 2003-26763A) have been used.

When using a heat-curable resin composition as the sealing material for blue LED and white LED, the cured product of the heat-curable resin composition is required to retain a good colorless transparency for a long period of time. Under recent tendency toward high luminance and high output of LED, the resin cured product has come to be exposed to high temperatures to cause discoloration (yellowing), this making it difficult to retain a good colorless transparency for a long period of time. The phenyl group or nitrogen component in the curing accelerators is considered as the cause of yellowing of the resin cured product. Therefore, the combined use of the curing accelerator with the sealing epoxy-containing compound is undesirable in view of maintaining a good colorless transparency of the resin cured product while neglecting the improvement of the curability of the epoxy-containing compound.

SUMMARY OF THE INVENTION

An object of the present invention is to provide a heat-curable resin composition suitable as sealing materials for photoelectric transducers such as blue LED and white LED, which exhibits an excellent curability without using a curing accelerator and provides a colorless transparent cured product which is little discolored even under high-temperature conditions. Another object of the present invention is to provide a curing agent suitable for use in such a heat-curable resin composition.

As a result of extensive researches in view of the above objects, the inventors have found that a heat-curable resin composition containing a cyclohexanetricarboxylic monoester as a curing agent exhibits a good curability without using a curing accelerator and provides a colorless transparent cured product. The inventors have further found that such a heat-curable resin composition is suitable as sealing materials for photosemiconductors, particularly light emitting devices such as blue light emitting device and white light emitting device. The present invention has been accomplished on the basis of these findings.

Thus, the present invention relates to a cyclohexanetricarboxylic monoester represented by the following formula 1:

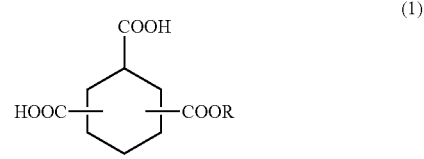

(1)

wherein R is a substituent group having 10 or less carbon atoms selected from $R^1$, $R^2$—O—$R^3$, $R^2$—CO—$R^3$ and $R^2$—COO—$R^3$ wherein $R^1$ is a straight-chain or branched alkyl group, $R^2$ is a straight-chain or branched alkylene group and $R^3$ is a straight-chain or branched alkyl group, one or more hydrogen in $R^1$, $R^2$ and $R^3$ being optionally replaced by a hydroxyl group or hydroxyl groups.

The present invention further relates to a heat-curable resin composition comprising an epoxy-containing compound and a curing agent, wherein the curing agent mainly comprises the cyclohexanetricarboxylic monoester. The present invention still further relates to a resin cured product of the heat-curable resin composition.

DETAILED DESCRIPTION OF THE INVENTION

The cyclohexanetricarboxylic monoester of the present invention is represented by the following formula 1:

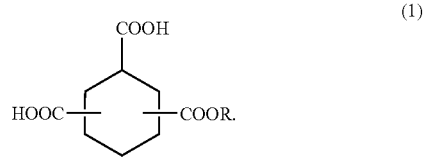

(1)

In the formula 1, R is a substituent group selected from $R^1$, $R^2$—O—$R^3$, $R^2$—CO—$R^3$ and $R^2$—COO—$R^3$. $R^1$ is a straight-chain or branched alkyl group, $R^2$ is a straight-chain or branched alkylene group and $R^3$ is a straight-chain or branched alkyl group. One or more hydrogen in $R^1$, $R^2$ and $R^3$ may be optionally replaced by a hydroxyl group or hydroxyl groups. In view of properties of the resultant heat-curable resin composition, R preferably has 10 or less carbon atoms, more preferably 5 or less carbon atoms.

Preferred examples of R include methyl, ethyl, n-propyl, isopropyl, n-butyl, isobutyl, 2-hydroxyethyl, 2,2-di(hydroxymethyl)butyl, 2-methoxyethyl, 2-ethoxyethyl, 1-methoxy-2-propyl, 1-ethoxy-2-propyl, 3-methoxy-1-butyl, 2-isopropoxyethyl, α-acetylethyl, and α-methoxycarbonyl-2-propyl.

Specific examples of the cyclohexanetricarboxylic monoesters of the formula 1 include cyclohexane-1,3,4-tricarboxylic 4-ester, cyclohexane-1,2,4-tricarboxylic 2-ester, cyclohexane-1,2,4-tricarboxylic 4-ester, cyclohexane-1,3,5-tricarboxylic 5-ester, etc. These compounds may be used alone or in combination of two or more as the curing agent for the heat-curable resin component comprising the epoxy-containing compound and the curing agent.

The cyclohexanetricarboxylic monoester of the present invention may be produced, for example, by the reaction of a cyclohexanetricarboxylic anhydride and an alcohol compound. For example, cyclohexane-1,3,4-tricarboxylic 4-ester and/or cyclohexane-1,2,4-tricarboxylic 2-ester may be produced by reacting a cyclohexane-1,3,4-tricarboxylic 3,4-anhydride and an alcohol compound at 20 to 100° C. for 0.5 to 10 h in the absence of catalyst or in the presence of a basic catalyst such as triethylamine, tributylamine and dimethylaniline.

Examples of the alcohol compounds include alcohols having 10 or less carbon atoms such as methyl alcohol, ethyl alcohol, n-propyl alcohol, isopropyl alcohol, n-butyl alcohol, isobutyl alcohol, ethylene glycol and trimethylolpropane; etherified alcohols having 10 or less carbon atoms such as 2-methoxyethyl alcohol, 2-ethoxyethyl alcohol, 1-methoxy-2-propyl alcohol, 1-ethoxy-2-propyl alcohol, 3-methoxy-1-butyl alcohol and 2-isopropoxyethyl alcohol; keto alcohols having 10 or less carbon atoms such as 3-hydroxy-2-butanone; and ester-containing alcohols having 10 or less carbon atoms such as methyl hydroxyisobutyrate. In view of properties of the resultant heat-curable resin composition, monohydric alcohols having 10 or less carbon atoms are preferred, and monohydric alcohols having 5 or less carbon atoms are more preferred in the present invention.

The curing agent referred to in the present invention mainly comprises the cyclohexanetricarboxylic monoester of the formula 1. In addition thereto, a alicyclic acid anhydride such as methylhexahydrophthalic anhydride, methyltetrahydrophthalic anhydride, hexahydrophthalic anhydride and tetrahydrophthalic anhydride may be combinedly used in an amount not affecting the curability of the heat-curable resin composition and the transparency of the cured product, for example, 0 to 50% by weight of the cyclohexanetricarboxylic monoester.

Examples of the epoxy-containing compounds include bisphenol A epoxy resins, bisphenol F epoxy resins, cresol novolak epoxy resins, phenol novolak epoxy resins, biphenyl epoxy resins, stilbene epoxy resins, hydroquinone epoxy resins, naphthalene skeleton epoxy resins, tetraphenylolethane epoxy resins, di-n-pentyl phthalate epoxy resins, tris(hydroxyphenyl)methane epoxy resins, dicyclopentadiene phenol epoxy resins, alicyclic epoxy compounds such as 3,4-epoxycyclohexylmethyl-3',4'-epoxycyclohexanecarboxylate and vinylcyclohexenediepoxide, silicon-containing epoxy resins such as triglycidoxyphenylsilane (TGPS) and 3-glycidoxypropyltorimethoxysilane, diglycidyl ethers of bisphenol A-ethyleneoxide adducts, diglycidyl ethers of bisphenol A-propyleneoxide adducts, cyclohexanedimethanol diglycidyl ethers, polyglycidyl ethers of aliphatic polyhydric alcohols, polyglycidyl esters of polybasic acids such as diglycidyl esters of hexahydrophthalic anhydride, alkyl glycidyl ethers such as butyl glycidyl ether and lauryl glycidyl ether, glycidyl ethers having one epoxy group such as phenyl glycidyl ether and cresyl glycidyl ether, and acryl derivatives such as glycidyl acrylate and glycidyl methacrylate. The hydrogenated products of the above epoxy-containing compounds in their nucleus are also usable. These compounds may be used singly or in combination of two or more. In particular, the use of at least one epoxy-containing compound selected from the alicyclic epoxy-containing compounds, epoxy-containing compounds having their nucleus hydrogenated and acryl derivatives is preferable because the colorless transparency of cured products is more improved.

The blending ratio of the epoxy-containing compound and the curing agent in the heat-curable resin composition is not particularly limited as long as the aimed effects of the present invention are attained, and preferably 0.1 to 3.0, more preferably 0.3 to 1.5 in terms of the equivalent ratio represented by the following formula:

$$\text{Equivalent ratio} = (X/2)/Y$$

wherein X is a total carboxyl corresponding number in the curing agent when assuming one acid anhydride group as a carboxyl corresponding number of 2 and one carboxylic acid group and one carboxylic ester group as a carboxyl corresponding number of 1, and Y is a number of epoxy groups in the epoxy-containing compound.

In the present invention, the terms "carboxylic ester group" include, in addition to typical carboxylic ester groups, —COOR wherein R is $R^2$—O—$R^3$, $R^2$—CO—$R^3$ and $R^2$—COO—$R^3$ as defined in the formula 1.

When the equivalent ratio is 0.1 or higher, the curing reaction proceeds sufficiently. When the equivalent ratio is 3.0 or lower, the cured product is preferably prevented from the lowering in the glass transition temperature (Tg), the deterioration in the moisture absorption and colorless transparency, and the discoloration under high-temperature conditions and under high-energy light irradiation. The carboxyl corresponding number is determined by neutralization titration, etc., and the number of epoxy groups is calculated from the epoxy equivalent.

The heat-curable resin composition of the present invention exhibits a good curability without using any curing accelerator. However, if appropriate, the heat-curable resin composition may contain the curing accelerator unless the colorless transparency of the resultant cured product is adversely affected. Examples of the curing accelerator usable in the present invention include tertiary amines such as benzyldimethylamine, tris(dimethylaminomethyl)phenol and dimethylcyclohexylamine; imidazole compounds such as 1-cyanoethyl-2-ethyl-4-methylimidazole, 2-ethyl-4-methylimidazole and 1-benzyl-2-methylimidazole; organophosphorus compounds such as triphenylphosphine and triphenyl phosphite; quaternary phosphonium salts such as tetraphenylphosphonium bromide and tetra-n-butylphosphonium bromide; diazabicycloalkenes such as 1,8-diazabicyclo[5.4.0]undecene-7 and organic acid salts thereof; organometallic compounds such as zinc octanoate, tin octanoate and aluminum-acetylacetone complex; quaternary ammonium salts such as tetraethylammonium bromide and tetrabutylammonium bromide; boron compounds such as boron trifluoride and triphenyl borate; and metal halides such as zinc chloride and stannic chloride. Also usable are latent curing accelerators. Examples thereof include high-boiling dispersion latent curing accelerators such as amine-modified accelerators comprising adducts of epoxy-containing compounds with high-boiling imidazole compounds, dicyandiamide or amines; microencapsulated latent curing accelerators prepared by coating the surface of imidazole-, phosphorus- or phosphine-based accelerators with polymers; and high-temperature dissociating, thermally cation-polymerizable latent curing accelerators such as amine salt latent curing accelerators, Lewis acid salts and Brønsted acid salts. These curing accelerators may be used singly or in combination of two or more.

The heat-curable resin composition of the present invention may also contain, if required, various additives unless the addition thereof adversely affects the aimed effects of the present invention. Examples of the additives include aliphatic polyols such as ethylene glycol and propylene glycol; aliphatic or aromatic carboxylic acids; carbon dioxide gas inhibitors such as phenol compound; flexibilizers such as polyalkylene glycol; antioxidants; plasticizers; lubricants; silane coupling agents; inorganic fillers; surface-treating agents; flame retardants; antistatic agents; colorants; leveling agents; ion-trapping agents; slide modifiers; various rubbers; organic polymer beads; glass beads; inorganic fillers such as glass fibers; impact modifiers; thixotropic agents; surfactants; surface tension modifiers; defoamers; anti-setting agents; light-diffusing agents; ultraviolet absorbers; antioxidants; releasing agents; fluorescent agents; and conductive fillers.

The method for the reaction between the epoxy-containing compound and the curing agent (curing method) is not particularly limited, and any of known curing apparatuses such as closed curing oven and tunnel kiln capable of continuous curing operation may be employed. The heat source is not particularly limited, and the heating may be conducted by a known method such as hot-air circulation, infrared heating and induction heating. The curing temperature and time are preferably 80 to 250° C. and 30 s to 10 h. To reduce the internal stress of the cured product, the heat-curable resin composition is preferably pre-cured at 80 to 120° C. for 0.5 to 5 h, and then post-cured at 120 to 180° C. for 0.1 to 5 h. For short-time curing, it is preferred to cure at 150 to 250° C. for 30 s to 30 min.

The heat-curable resin composition of the present invention is suitably applied to sealing materials for blue LED and white LED, because its cured product is colorless and transparent and is less discolored even under long-term exposure to high-temperature conditions.

In addition to the applications or uses described above, the heat-curable resin composition of the present invention is further applicable to the uses requiring a good transparency, for example, applicable to insulating sealing materials for photoelectric transducers such as light emitting devices such as other LED and semiconductor lasers, photoconductive devices, photoreceptors such as photodiodes, solar cells, phototransistors and photothyristers, and optocouplers such as photocouplers and photointerrupters; adhesives for liquid crystals; photosensitive resins; surface coating agents for plastics, glass and metals; and decorative materials. Further, the heat-curable resin composition of the present invention is further applicable to forming insulating seals and shaped articles of 2 mm thick or more by a method such as potting, casting filament-winding and lamination. Specifically, applicable to the insulating seals for heavy electric apparatuses such as mold transformers including current transformers (CT), zero layer current transformers (ZCT), potential transformers (PT) and grounding potential transformers (GPT); parts of gas switches including insulating spacers, supporting insulators, operating rods, closed terminals, bushings, insulating pillars, etc.; parts of solid-state insulator switches; parts of automatic overhead wiring apparatuses including rotary insulators, voltage detector elements, general capacitors, etc.; parts of underground wiring apparatuses including mold disconnecting switches, power transformers, etc.; static condensers; resin insulators; and linear motor car coils, and also applicable to impregnating varnishes for coils of various rotating apparatuses such as generators and motors. In addition, the heat-curable resin composition of the present invention may also be used in weak electric applications such as potting resins for flyback transformers, ignition coils or AC capacitors; transparent sealing resins for LED, detectors, emitters or photocouplers; and impregnating resins for film capacitors and various coils. Other applications of the heat-curable resin composition of the present invention include laminate applications and applications not necessarily required to be insulating such as various FRP shaped articles, various coating materials, adhesives and decorative materials.

The present invention will be described in more detail with reference to the following examples. However, it should be noted that the following examples are only illustrative and not intended to limit the invention thereto.

PRODUCTION EXAMPLE 1

Into a four-necked flask equipped with a thermometer, a stirring device, a condenser and a temperature controller, 198 parts by weight of cyclohexane-1,3,4-tricarboxylic 3,4-anhydride and 300 parts by weight of n-propyl alcohol were charged and allowed to react at 100° C. for 3 h. After the reaction, the excess n-propyl alcohol was distilled off under reduced pressure to obtain monopropyl ester of cyclohexane-1,3,4-tricarboxylic acid as a colorless and transparent liquid. The product was identified by confirming the disappearance of the characteristic absorption of acid anhydride group (1850 and 1790 $cm^{-1}$) and the appearance of the characteristic absorption of ester group (1735 $cm^{-1}$) on infrared absorption spectra, and by determining the molecular weight using a gas chromatograph-mass spectrometer.

Evaluation of Curability

EXAMPLE 1

After mixing 26.4 parts by weight of the monopropyl ester of cyclohexane-1,3,4-tricarboxylic acid obtained in Production Example 1 with 41.0 parts by weight of a nucleus-hydrogenated product of bisphenol A epoxy resin ("YX8000" available from Japan Epoxy Resin Co., Ltd.; epoxy equivalent: 205), the mixture was evaluated for the curability by measuring the torque rise initiation time at 170° C. using a labo plastomill "LABO PLASTOMILL 30C150" available from Toyo Seiki Seisakusho Co., Ltd. The results are shown in Table 1.

COMPARATIVE EXAMPLE 1

The procedure of Example 1 was repeated except for using 33.8 parts by weight of "Rikacid MH700" (available from New Japan Chemical Co., Ltd., mainly composed of methylhexahydrophthalic anhydride) in place of the monopropyl ester of cyclohexane-1,3,4-tricarboxylic acid. The results are shown in Table 1.

TABLE 1

|  | Example 1 | Comparative Example 1 |
|---|---|---|
| Torque rise initiation time (min) | 38 | ≧120 |

As seen from Table 1, the heat-curable resin composition of the present invention is excellent in the curability without adding a curing accelerator.

Evaluation of Light Transmittance

EXAMPLE 2

A mixture of 132 parts by weight of the monopropyl ester of cyclohexane-1,3,4-tricarboxylic acid obtained in Production Example 1 and 205 parts by weight of a nucleus-hydrogenated product of bisphenol A epoxy resin ("YX8000"; epoxy equivalent: 205) was cured at 120° C. for 2 h and then at 150° C. for 3h to obtain a cured product of 1 mm thick. The cured product was heat-treated in air at 150° C. for 24 h and measured for the 400 nm-light transmittance before and after the heat treatment using a spectrophotometer "UV-3100" available from Shimadzu Corporation. From the measured values, a light transmittance retention rate before and after the heat treatment was calculated. The results are shown in Table 2.

COMPARATIVE EXAMPLE 2

The procedure of Example 2 was repeated except for using 168 parts by weight of "Rikacid MH700" (available from New Japan Chemical Co., Ltd., mainly composed of methylhexahydrophthalic anhydride) in place of the monopropyl ester of cyclohexane-1,3,4-tricarboxylic acid and using 3.7 parts by weight of 2-ethyl-4-methylimidazole as a curing accelerator. The results are shown in Table 2.

TABLE 2

|  | Example 2 | Comparative Example 2 |
|---|---|---|
| Before 24 h/150° C. treatment in air (%) | 70.4 | 59.2 |
| After 24 h/150° C. treatment in air (%) | 50.4 | 19.1 |
| 400 nm light transmittance retention rate (%) | 71.6 | 32.3 |

As seen from Table 2, the cured product from the heat-curable resin composition of the present invention is excellent in the light transmittance and retains the colorless transparency even after heat treatment.

By using the cyclohexanetricarboxylic monoester of the present invention as the curing agent for a heat-curable resin composition containing an epoxy-containing compound, a heat-curable resin composition which exhibits a good curability without using a curing accelerator and provides a colorless transparent cured product which is little discolored under a long-term exposure to high-temperature conditions is obtained. Such a heat-curable resin composition is suitable as sealing materials for photosemiconductors such as blue LED and white LED, shaped articles, coating materials, adhesives, etc.

What is claimed is:

1. A heat-curable resin composition comprising: an epoxy-containing compound having at least two epoxy groups per molecule, and a curing agent;
    wherein said curing agent includes a cyclohexanetricarboxylic monoester represented by the following formula 1:

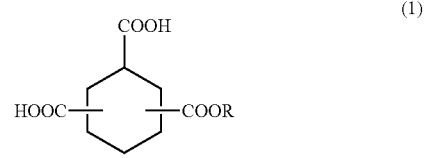

(1)

wherein R is a substituent group having 10 or less carbon atoms selected from: $R^1$, $R^2$—O—$R^3$, $R^2$—CO—$R^3$, and $R^2$—COO—$R^3$; wherein: $R^1$ is a straight-chain or branched alkyl group, $R^2$ is a straight-chain or branched alkylene group, and $R^3$ is a straight-chain or branched alkyl group; and
    wherein one or more hydrogen in $R^1$, $R^2$, and $R^3$ being optionally replaced by a hydroxyl group or hydroxyl groups.

2. The heat-curable resin composition according to claim 1, which is made into a cured product.

3. The heat-curable resin composition according to claim 1 in a form of a sealing material for photosemiconductors.

4. The heat-curable resin composition according to claim 1, wherein the curing agent is at least one compound selected from the group consisting of cyclohexane-1,3,4-tricarboxylic 4-ester, cyclohexane-1,2,4-tricarboxylic 4-ester, cyclohexane-1,2,4-tricarboxylic 4-ester and cyclohexane-1,3,5-tricarboxylic 5-ester.

5. The heat-curable resin composition according to claim 1, which is made into a colorless and transparent cured product.

6. The heat-curable resin composition according to claim 1, which is made into a product cured at a curing temperature of 80 to 250° C. and for a curing time of 30 seconds to 10 hours.

7. The heat-curable resin composition according to claim 1, which is made into a product cured at a curing temperature of 80 to 120° C. and for a curing time of 0.5 to 5 hours, followed by an after-curing at a temperature of 120-180° C. and for a curing time of 0.1 to 5 hours.

8. The heat-curable resin composition according to claim 1, wherein said epoxy-containing compound is an epoxy-containing resin.

9. The heat-curable resin composition according to claim 8, wherein said epoxy-containing resin is selected from the group consisting of: bisphenol A epoxy resins, bisphenol F epoxy resins, cresol novolak epoxy resins, phenol novolak epoxy resins, biphenyl epoxy resins, stilbene epoxy resins, hydroquinone epoxy resins, naphthalene skeleton epoxy resins, tetraphenylolethane epoxy resins, di-n-pentyl phthalate epoxy resins, tris(hydroxyphenyl) methane epoxy resins, dicyclopentadiene phenol epoxy resins, and silicon-containing epoxy resins.

10. The heat-curable resin composition according to claim 1, wherein the epoxy-containing compound is selected from the group consisting of: alicyclic epoxy compounds, cyclohexanedimethanol diglycidyl ethers, polyglycidyl ethers of aliphatic polyhydric alcohols, polyglycidyl esters of polybasic acids, and acryl derivatives of epoxy-containing compounds.

11. The heat-curable resin composition according to claim 1, wherein a blending ratio of the epoxy-containing compound and the curing agent is in a range of from 0.1 to 3.0 in terms of an equivalent ratio represented by the following formula:

Equivalent ratio=$(X/2)/Y$ wherein X is a total carboxyl corresponding number in the curing agent when assuming one acid anhydride group as a carboxyl corresponding number of 2 and one carboxyl corresponding number of 1, and Y is a number of epoxy groups in the epoxy-containing compound.

12. The heat-curable resin composition according to claim 11, wherein the blending ratio is in a range of from 0.3 to 1.5 in terms of the equivalent ratio.

\* \* \* \* \*